(12) United States Patent
Xu et al.

(10) Patent No.: US 7,933,978 B2
(45) Date of Patent: Apr. 26, 2011

(54) METHOD, DEVICE AND SYSTEM FOR IMPLEMENTING VPN CONFIGURATION SERVICE

(75) Inventors: Yongliang Xu, Shenzhen (CN); Jianhua Gao, Shenzhen (CN); Chengqing Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 12/276,659

(22) Filed: Nov. 24, 2008

(65) Prior Publication Data

US 2009/0083403 A1    Mar. 26, 2009

Related U.S. Application Data

(63) Continuation of application No. PCT/CN2007/001260, filed on Apr. 18, 2007.

(30) Foreign Application Priority Data

Jun. 2, 2006    (CN) .......................... 2006 1 0060995

(51) Int. Cl.
  *G06F 15/16*    (2006.01)
  *G06F 12/00*    (2006.01)
(52) U.S. Cl. ........................................ 709/220; 709/221
(58) Field of Classification Search .......... 709/220–221, 709/230, 245, 250, 227–229
  See application file for complete search history.

(56) References Cited

U.S. PATENT DOCUMENTS

| | | | |
|---|---|---|---|
| 6,693,878 B1 * | 2/2004 | Daruwalla et al. ............. | 370/235 |
| 2002/0144144 A1 * | 10/2002 | Weiss et al. ................... | 713/201 |
| 2002/0156828 A1 | 10/2002 | Ishizaki et al. | |
| 2002/0169866 A1 * | 11/2002 | Lim et al. ....................... | 709/223 |
| 2003/0041136 A1 * | 2/2003 | Cheline et al. ................. | 709/223 |
| 2003/0177221 A1 * | 9/2003 | Ould-Brahim et al. ........ | 709/223 |
| 2004/0199644 A1 | 10/2004 | Gass et al. | |
| 2006/0130135 A1 * | 6/2006 | Krstulich et al. ............... | 726/15 |
| 2007/0140251 A1 * | 6/2007 | Dong ............................. | 370/392 |
| 2008/0183854 A1 * | 7/2008 | Hopen et al. ................... | 709/223 |
| 2010/0094980 A1 * | 4/2010 | Sarkar et al. .................. | 709/221 |

FOREIGN PATENT DOCUMENTS

CN    1404263 A    3/2003
CN    1622529 A    6/2005

OTHER PUBLICATIONS

Komiya et al., "A proposal on Flexible CUG Service Architecture," *IEEE*, 315-320 (Jul. 2000).

McGee et al., "Dynamic Virtual Private Networks," *Bell Labs Technical Journal*, 6(2) 116-135 Jan. 2002).

* cited by examiner

*Primary Examiner* — Zarni Maung
(74) *Attorney, Agent, or Firm* — Leydig, Voit & Mayer, Ltd.

(57) ABSTRACT

The present invention provides a method, device and system for implementing a VPN configuration service. According to the invention, a VPN configuration request message is received at a network side and a verification is performed on the VPN configuration request message with a directory service table; and the directory service table is updated after the verification is passed; and, thus, a VPN configuration is implemented. Thus, the efficiency of the VPN service is improved. Through configuring the VPN policy information, the VPN connection request of the user is limited within a closed user group and a corresponding control is performed on the VPN connection request of the user. Thus, a flexible management mode is achieved.

9 Claims, 3 Drawing Sheets

METHOD, DEVICE AND SYSTEM FOR IMPLEMENTING VPN CONFIGURATION SERVICE

CROSS-REFERENCE TO RELATED APPLICATIONS

This application is a continuation of International Patent Application No. PCT/CN2007/001260, filed Apr. 18, 2007, which claims priority to Chinese Patent Application No. 200610060995.6, filed Jun. 2, 2006, both of which are hereby incorporated by reference in their entirety.

FIELD OF THE INVENTION

The present invention relates to the field of network communications, and in particular, to a method, device, and system for implementing a Virtual Private Network (VPN) configuration service.

BACKGROUND OF THE INVENTION

Generally, the VPN network includes a Customer Edge (CE) device, a Provider Edge (PE) device, and a Provider (P) device which is an internal device in the network. The CE device is a customer edge node and is an egress/ingress of VPN user ends on the same site. The PE device is an edge node of the transport network and functions as an edge device responsible for providing users with VPN services in the transport network. One PE device is connected to at least one CE device and is at least connected to another transport network device. In other words, the PE device is connected with P device. The P device is an internal transport device in the transport network and is connected with other transport network devices in the transport network. However, the P device does not directly connect to the CE device.

One solution of the prior art is as follows.

The VPN service is generally implemented by a Network Management System (NMS). As shown in FIG. 1, the NMS implements the VPN configuration and the establishment of the user VPN connection service. Specifically, the solution includes the following steps.

1. VPN information, including VPN member information and VPN policy information, is manually configured in the NMS.

2. When a user needs to establish a VPN connection, the user sends a VPN connection request message to the NMS.

3. The NMS performs a verification on the request from the user according to the VPN information preconfigured, and establishes the network connection when the verification is passed.

Another solution of the prior art is as follows.

An auto-detection for VPN member is implemented and the VPN service is provided via Border Gateway Protocol (BGP). In combination with the auto-detection for VPN member as described in BGP, the VPN connection service is provided by the network through the following processes.

1. The VPN member information is configured on the PE device and the VPN member is identified with <CPI PPI>. The CPI is the port ID of the access network device on the CE device and the PPI is the port ID of the port connecting with the CE device on the PE device.

2. The PE device interacts with other PE devices in VPN via BGP after configuring the VPN member information. Thus, a VPN member information table PIT is configured on all PE devices in the VPN through the auto-detection mechanism for VPN member.

3. When a CE device needs to communicate with other VPN members, a PE device performs a verification on a VPN communication request from the CE device, according to the VPN member information table PIT. After the verification is passed, the VPN connection is established.

In the above solutions, both the VPN member information and the VPN policy information are configured manually on the NMS or the PE device by an administrator. When the VPN member changes dynamically, the VPN network configuration information needs to be added, deleted, or modified; thus, a large time delay is caused and the management mode is not flexible.

SUMMARY OF THE INVENTION

The invention provides a method, device, and system for implementing a VPN configuration service. Thus, the VPN member information and the VPN policy information may be configured flexibly and the VPN member may join and exit dynamically.

One embodiment of the present invention provides a method for implementing a VPN configuration service, including:

receiving a VPN configuration request message at a network side and performing a verification on the VPN configuration request message with a directory service table; and updating the directory service table after the verification is passed and performing a VPN configuration, according to the directory service table updated.

Another embodiment of the present invention provides a system for implementing a VPN configuration service, including a customer edge device, a provider edge device, and a provider device, the provider edge device being connected with at least one customer edge device and connected with other provider edge device or provider device, wherein the system further includes a directory server adapted to:

store a directory service table at least including a VPN ID and VPN policy information for verifying a VPN configuration request message and/or configuring VPN configuration information; and perform a verification on the VPN configuration request message according to the directory service table, when the VPN configuration request message is received at a network side, and update the directory service table and implement a VPN configuration according to the directory service table updated, after the verification is passed.

Another embodiment of the present invention provides a directory server, including a verification module, a configuration module, and a storage unit;

the storage unit is adapted to store a directory service table;

the verification module is adapted to perform a verification on a VPN configuration request message according to the directory service table and send a configuration request message to the configuration module; and the configuration module is adapted to update the directory service table, according to the configuration request message received.

According to the present invention, the VPN configuration service is implemented based on the directory service and the VPN member information and the VPN policy information are stored in the directory service table. When a user requests to change the VPN configuration information, a VPN operation, such as adding or deleting a VPN member and changing the configuration of the VPN policy, is implemented rapidly by inquiring the directory service table. Thus, the efficiency of the VPN service is improved. Through configuring the VPN policy information, the VPN connection request of the user is limited within a closed user group, and the VPN connection request of the user is controlled.

DETAILED DESCRIPTION OF THE EMBODIMENTS

With reference to the figures, embodiments of the present invention are described as below.

In the present invention, the VPN configuration is implemented via the directory service. In the system according to the present invention, the network includes a directory server, located on a separate computer outside the network or on a transport device in the network, such as the PE device and the P device. The directory server maintains a table showing the relationship between the VPN ID and the VPN member ID in the form of directory, and the table is the directory service table. Thus, an auto-registration and maintenance of the VPN configuration information is implemented via the directory service. The information for maintaining the VPN by the user is transported through the interaction between the CE and PE devices. The VPN member information and the VPN policy information in the directory service table (including the policy information based on the CE and the policy information based on the VPN) are dynamically added, deleted, and modified via the interaction between the PE device and the directory server. When a user requests to establish, delete, or maintain a VPN connection via the network, the user first queries the directory service table to verify whether the request accords with corresponding VPN member and whether the request accords with corresponding VPN policy information. The VPN policy information includes: the requested maximum bandwidth value, Service Level Agreement (SLA) attribute value, and so on. When the verification is passed, the network may respond to the request and provide corresponding VPN configuration service. Thus, the VPN information may be configured flexibly and the VPN service is provided rapidly.

The VPN member ID in the directory service table may be configured with the following two methods.

Transport Network Assigned Address (TNA): In this method, the port number may also be added. The TNA is a global unique address assigned for the physical link of the user device access network by the transport network. With the TNA, the operator may identify the data bearer link of the user device access network. When one TNA corresponds to a plurality of data bearer links, a data bearer link of the user device access network may be identified with the TNA and the port number.

<CPI, PPI>: This method uses the <CPI, PPI> combination to identify a VPN member. The CPI is the port ID for accessing the VPN network by a CE device and the PPI is the port ID for connecting the CE device with the PE device. The combination of the two port IDs can identify a VPN member uniquely.

The technical solution of the present invention is further described with the process in which the VPN member is dynamically maintained in the VPN as an example.

Figure 1:
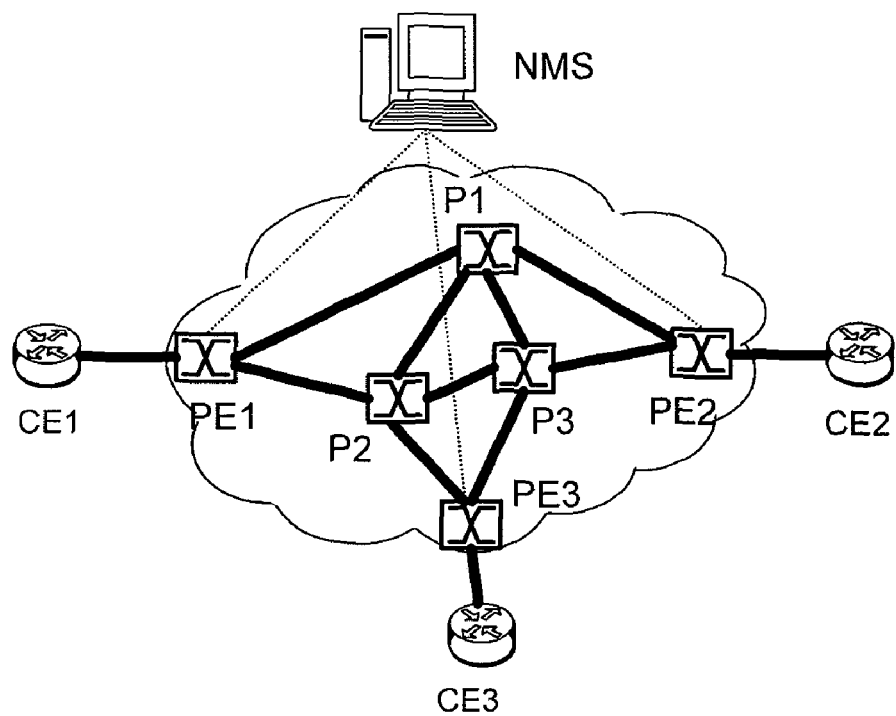
FIG. 1 is a schematic diagram showing that the VPN service is implemented by a NMS system.
Figure 2:
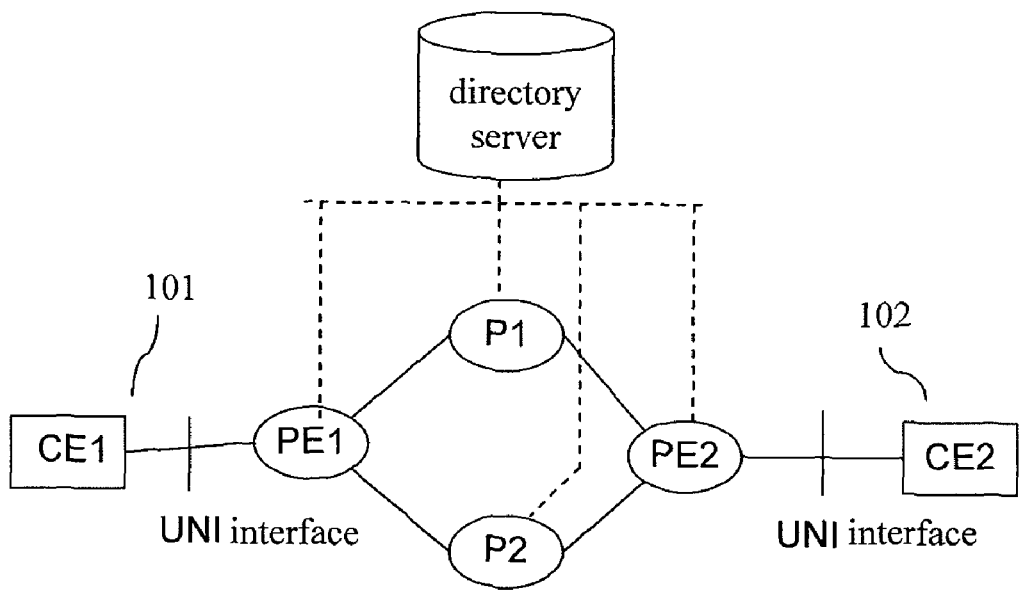
FIG. 2 is a schematic diagram showing the system for implementing the VPN configuration service, according to the present invention.

FIG. 2 is a diagram showing the system for implementing the VPN configuration service. In FIG. 2, CE 1 and CE 2 indicate CE devices belonging to the same VPN network. The CE device may be a Layer 1, Layer 2, or Layer 3 device, such as TDM cross connection device, Layer2 exchanger, and router. The network nodes PE 1 and PE 2 are the PE devices in the VPN network. The PE device may be a TDM exchanger, an Optic Cross Connect System (OXC) device, a Fiber switch (FXC) device, or a device capable of mapping an Ethernet signal to an Ethernet lease line device connected in Layer 1. The network node P1 and P2 are internal devices in the network and devices P1 and P2 are Layer 1 devices, such as TDM exchanger, OXC device, and FXC device. The transport nodes such as PE1, PE2, P1, and P2 are interconnected with lines based on the TDM technology, such as SDH links. The system also includes a directory server. The control plane of the whole network runs the GMPLS protocol. The interface between CE 1 and PE 1 and the interface between PE2 and CE 2 are user-network interfaces (UNIs). The process in which the UNI is used for communication is described in the UNI 1.0 Standard. The UNI defines a number of addresses including: an internally transported network address, which is the address of an internal node in the operator network and is used as an internal routing for the network management and will not be exposed to the user; a user address, which is the address of the user node in the user network and is not exposed to the operator; and a TNA address, which is a global unique address of at lease one data bearer link for UNI Signaling Agent-Network (UNI-N) and UNI Signaling Agent-Client (UNI-C) assigned by the network. In FIG. 2, the TNA address of node CE1 assigned by the network is 101 and the TNA address of node CE 2 assigned by the network is 102.

Figure 3:
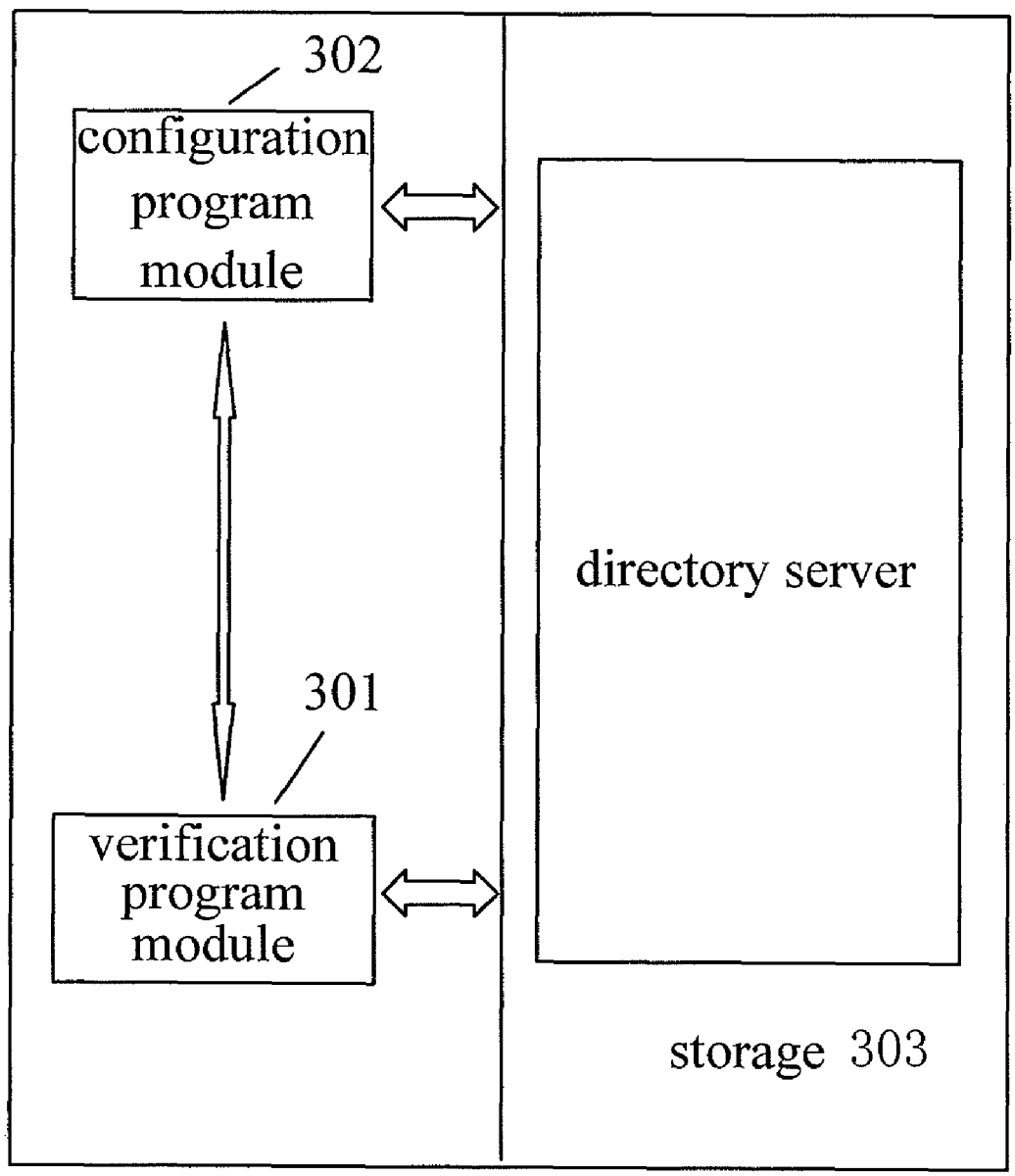
FIG. 3 is a schematic diagram showing the structure of the directory server, according to the present invention.

FIG. 3 shows the basic structure of the directory server. The directory server includes a verification program module 301, a configuration program module 302, and a storage 303. The verification program module 301 performs a verification on the VPN configuration request message according to the directory service table, and sends a configuration message to the configuration program module 302 if the verification is passed. The configuration program module 302 processes the VPN configuration request message after receiving the VPN configuration request message, including adding a VPN member, deleting a VPN member, modifying a VPN policy, and updating a directory service table stored in the storage. The directory service table may use the format as shown in Table 1.

TABLE 1

| VPN ID | VPN member ID (TNA address/port number) | Per-CE Policy | Per-VPN Policy |
|--------|------------------------------------------|---------------|----------------|
| 1      | 101/10                                   | Policy 11     | Policy 1       |
| 1      | 102/10                                   | Policy 12     |                |
| 1      | 103                                      | Policy 13     |                |
| 2      | 201                                      | Policy 21     | Policy 2       |
| 2      | 202/11                                   | Policy 22     |                |
| ...    | ...                                      | ...           | ...            |

Optionally, the VPN member ID may also be the TNA address, the TNA and the port number, or <CPI, PPI>. Table 1 only shows an example of the present invention and cannot be considered as any constraint on the present invention.

Figure 4:
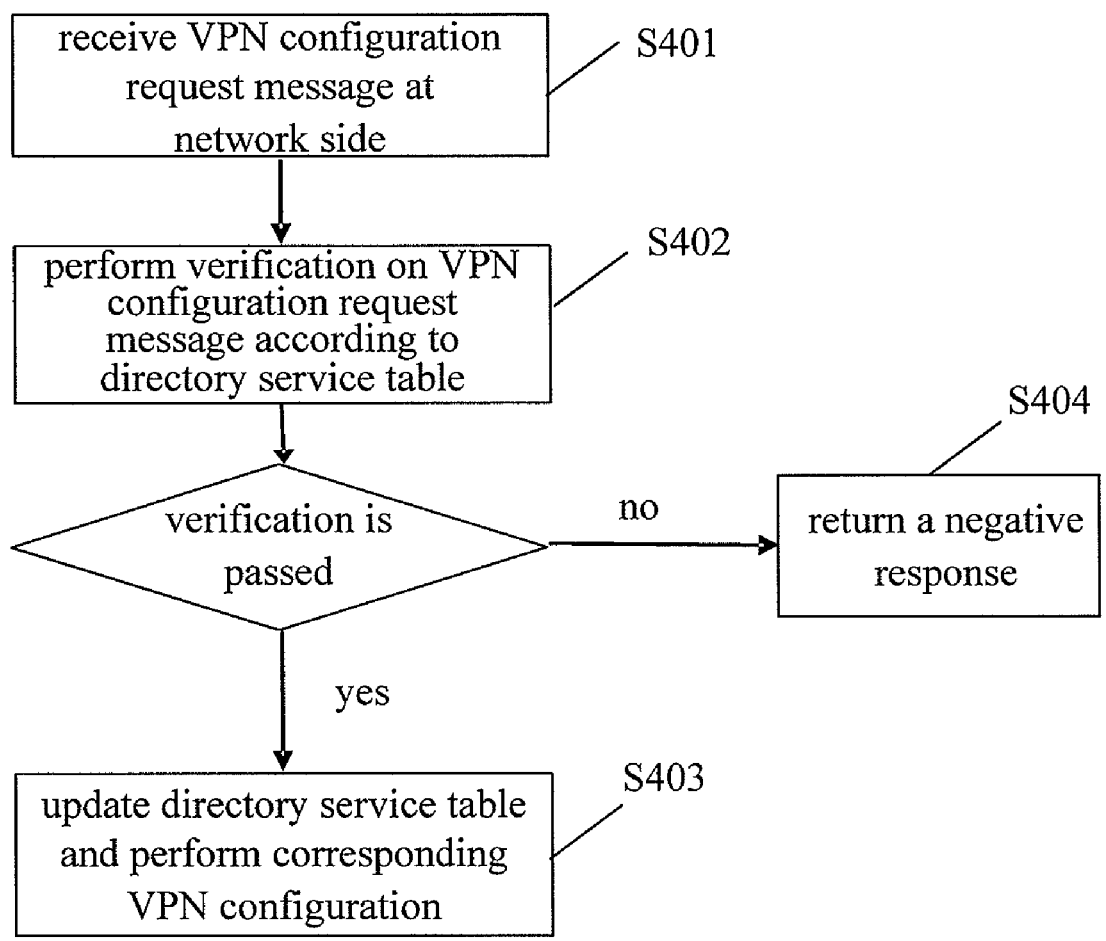
FIG. 4 is a schematic diagram showing the method for implementing the VPN configuration service, according to the present invention.

FIG. 4 is a schematic diagram showing the method for implementing the VPN configuration service, according to one embodiment of the present invention. The method includes the following processes.

S401: The network receives the VPN configuration request message.

S402: The VPN configuration request message is verified, according to the directory service table.

S403: The directory service table is updated to complete the VPN configuration, after the verification is passed.

S404: If the verification is not passed, a negative response is returned.

In the method for implementing the VPN configuration service according to one embodiment of the present invention, the VPN ID and part or all of policy information based on the VPN are preconfigured on the directory server, including the maximum number of the member nodes which are allowed to dynamically access the VPN.

The dynamical maintenance for the VPN member through the directory service may be implemented with two methods as below.

Embodiment 1

When a CE device initiates a VPN configuration request message, i.e. requests to add, delete VPN member, or modify VPN policy information, the CE device sends a corresponding request message to the PE device via a UNI interface. The PE device forwards the request message to the directory server and the directory server inquires a directory server to perform a verification on the request message. After the verification is passed, the VPN information is updated on the directory server and the VPN configuration is completed. When two CE devices need to communicate with each other, the PE device inquires the directory server, according to the VPN connection request message forwarded by the CE device, so as to perform a verification on the VPN connection request message. When the verification is passed, a VPN connection may be established between the source CE device and the destination CE device. Thus, the source CE device and the destination CE device can only communicate with the VPN members with the same VPN ID on the premise of the permission of the corresponding VPN policy.

With reference to FIG. 2, the process for maintaining the VPN member is described as below.

1. The VPN member is added as follows.

1) The device CE1 sends the request message for requesting to add a VPN member to the device PE1 via a UNI interface. The request message includes VPN ID1, VPN member ID 101, and VPN policy information Policy 11 based on the device CE1, such as the allowed maximum bandwidth BWmax. The VPN ID and the VPN member ID shall be included, while the VPN policy information based on the device CE1 is optional.

2) After the PE1 receives the request message, the PE1 forwards the request message to the directory server F.

3) The directory server verifies whether the message is legal by inquiring the directory service table through the two following methods.

a) It is verified whether the VPN ID1 exists in the directory service table.

a1) If the VPN ID1 does not exist in the directory service table, a negative response is returned to refuse to add CE 1 as the VPN member.

a2) If the VPN ID1 exists in the directory service table, it is further determined whether the VPN member ID 101 exists in the table item corresponding to the VPN ID 1.

a21) If the VPN member ID 101 exists in the table item corresponding to the VPN ID 1, a negative response is returned to refuse to add the device CE 1 because the device CE 1 exists in the directory service table.

a22) If the VPN member ID 101 does not exist in the table item corresponding to the VPN ID 1, the verification is passed and a positive response is returned. The VPN member ID 101 and other VPN information included in the request message, such as policy information based on the device CE1, is added into corresponding table item of the directory service table.

b) It is verified whether the VPN ID1 exists in the directory service table.

b1) If the VPN ID1 does not exist in the directory service table, a negative response is returned to refuse to add CE 1 as the VPN member.

b2) If the VPN ID1 exists in the directory service table, it is further determined whether the VPN member ID 101 exists in the table item corresponding to the VPN ID 1.

b21) If the VPN member ID 101 exists in the table item corresponding to the VPN ID 1, a negative response is returned to refuse to add the device CE 1 because the device CE 1 exists in the directory service table.

b22) If the VPN member ID 101 does not exist in the table item corresponding to the VPN ID 1, it is further determined whether the policy information based on the VPN in corresponding table item in the directory service table is satisfied. For example, in the policy information Policy 1 based on the VPN in corresponding table item, the maximum number of the node members which are allowed to dynamically access is 3.

b221) If the number of the members in the VPN is 0, 1 or 2, the verification is passed and a positive response is returned. The VPN member ID 101 and other VPN information included in the request message, such as policy information based on the device CE1, is added into corresponding table item of the directory service table.

b222) If the number of the members in the VPN is 3, the device CE1 is refused to be added as the VPN member and a negative response is returned.

2. The VPN member is deleted as follows.

1) The device CE1 sends a request message including VPN ID1 and VPN member ID 101 of a VPN member to be deleted to PE1 for deleting the VPN member.

2) PE1 forwards the request message, including VPN ID1 and VPN member ID 101 of the VPN member to be deleted, to the directory server.

3) The directory server verifies whether the request message is legal after receiving the request message. In other words, it is verified whether a table item whose VPN ID is 1 and whose VPN member ID is 101 exists in the directory service table.

a) If the table item exists, it is verified whether the policy information in the table item allows a VPN member to exit dynamically.

a1) If the VPN member is allowed to exist dynamically, the verification is passed and a positive response is returned. The VPN connections related to the node are deleted and the corresponding <VPN ID, VPN member ID> item <1, 100/10> is deleted from the corresponding directory service table item.

a2) If the VPN member is not allowed to exist dynamically, a negative response is returned.

b) If the table item does not exist, a negative response is returned.

3. The VPN policy is modified as follows.

1) The device CE1 sends a request message, including VPN ID1, VPN member ID 101, and policy information based on the CE or the VPN to PE1, for modifying the VPN policy.

2) PE1 forwards the request message, including VPN ID1, VPN member ID 101, and policy information based on the CE or the VPN, to the directory server.

3) The directory server verifies whether the VPN ID and the VPN member ID are legal after receiving the request message. In other words, it is verified whether a table item whose VPN ID is 1 and whose VPN member ID is 101 exists in the directory service table.

a) If the table item exists, it is further verified whether the policy information in the table item allows a VPN member to dynamically modify the policy information.

a1) If the policy information in the table item does not allow a VPN member to dynamically modify the policy information, a negative response is returned.

a2) If the policy information in the table item allows a VPN member to dynamically modify the policy information, the verification is passed and a positive response is returned. The policy information in the directory service table is updated to the policy information included in the request message.

b) If the table item whose VPN ID is 1 and whose VPN member ID is 101 does not exist, a negative response is returned.

4. The VPN connection is established as follows.

1) The device CE1 sends a request message including VPN ID1 of the VPN member to be established a connection, source VPN member ID 101/10, destination VPN member ID 102/10 and related request parameters, such as bandwidth and protection attribute.

2) PE1 forwards the request message for establishing the VPN connection to the directory server.

3) The directory server performs a verification on the VPN ID, the source VPN member ID and the destination VPN member ID according to the directory service table, and performs the verification on related request parameters according to the policy information based on CE and the policy information based on VPN. If the verification is not passed, a negative response is returned.

If the verification is passed, a VPN connection between CE1 and CE2 is established and a positive response is returned.

The implementation of the single domain is described as above and the implementation of the multi-domain is similar to that of the single domain.

Embodiment 2

The directory service table is not only stored on the directory server but also downloaded to each PE device, and the PE device does not need to store the directory service table items of all VPNs and only needs to store the directory service table items related to the VPN where the PE device locates.

The directory server updates the directory service table of the PE device under the following three conditions.

1) The directory server updates the directory service table of each PE node periodicity according to the update-time interval configured by the NMS.

2) When a VPN member is added or deleted or VPN policy information is modified, the directory server updates the directory service table of each PE device.

3) When a PE device requests the directory server to update the directory service table, the directory server returns an updated directory service table to the PE device.

During establishing the VPN connection, the PE node only needs to inquire the directory service table of the PE node and does not need to send a request to the directory server, as shown in FIG. 2.

The VPN member is added/the VPN member is deleted/the VPN policy is modified as follows.

1) The device CE1 sends a corresponding VPN configuration request message including the VPN information to the device PE2. Except that the destination of the request is the PE1 other than the directory server, the process is similar to that in Embodiment 1.

2) The device CE1 inquiries other directory service table and performs a verification on the request message and the verification process is similar to that of Embodiment 1.

When the verification is passed, a corresponding VPN configuration is implemented and the PE sends a message to the directory server to update the directory service table of the directory server.

Otherwise, a negative response is returned.

3) The directory server sends a message for updating the directory service table to other related PE.

The VPN connection between the devices CE1 and CE2 may be established as follows.

The device PE1 in the network receives a VPN connection request message from the device CE1 and inquires the directory service table in B to verify the VPN connection request message.

If the verification is passed, the VPN connection is established.

Otherwise, a negative response is returned.

Additional advantages and modifications will readily occur to those skilled in the art. Therefore, the invention in its broader aspects is not limited to the specific details and representative embodiments shown and described herein. Accordingly, various modifications and variations may be made without departing from the scope of the invention as defined by the appended claims and their equivalents.

What is claimed:

1. A method for implementing a Virtual Private Network, VPN, configuration service, comprising:

receiving a VPN configuration request message at a network side and performing a verification on the VPN configuration request message with a directory service table;

updating the directory service table after the verification being passed and performing a VPN configuration according to the updated directory service table;

sending a VPN connection request message comprising a VPN ID, a source VPN member ID and a destination VPN member ID after updating the directory service table and implementing the VPN configuration when a VPN connection needs to be established between users;

performing a verification on the VPN connection request message according to the directory service table; and establishing the VPN connection after the verification being passed.

2. The method according to claim 1, wherein, the directory service table is stored on a directory server and the directory server is adapted to perform the verification on the VPN configuration request message.

3. The method according to claim 1, wherein, the directory service table is stored on a provider edge device and the provider edge device is adapted to perform the verification on the VPN configuration request message.

4. The method according to claim 1, performing the verification on the VPN configuration request message comprises:

verifying whether the VPN configuration request message accords with a VPN policy information.

5. The method according to claim 1, wherein, the VPN configuration request message is a message for adding a VPN member and comprises a VPN ID and a VPN member ID, and updating the directory service table comprises:

- verifying whether the VPN member ID exists in a table item corresponding to the VPN ID when it is determined that the VPN ID exists in the directory service table; if the VPN ID does not exist in the directory service table, adding the VPN member ID to the directory service table; or
- verifying whether the VPN member ID exists in a table item corresponding to the VPN ID when it is determined that the VPN ID exists in the directory service table; if the VPN ID does not exist in the directory service table, verifying whether a VPN policy information in the directory service table is met; if the VPN policy information is met, determining that the verification is passed and adding the VPN member ID to the directory service table.

6. The method according to claim 1, wherein, the VPN configuration request message is a message for deleting a VPN member and comprises a VPN ID and a VPN member ID, and updating the directory service table comprises:

- verifying whether policy information in a table item allows the VPN member to dynamically exit, if it is determined that the VPN ID and the VPN member ID exist in the table item of the directory service table; and
- determining that the verification is passed and deleting the table item in the directory service table after determining that the verification is passed, if the policy information in the table item allows the VPN member to dynamically exit.

7. The method according to claim 1, wherein, the VPN configuration request message is a message for modifying a VPN policy and comprises a VPN ID and a VPN member ID, and updating the directory service table comprise:

- verifying whether policy information in a table item allows a VPN member to dynamically modify the VPN policy, if the VPN ID and the VPN member ID exist in the table item of the directory service table; and
- determining that the verification is passed and updating the policy information based on a Customer Edge, CE, device in the table item of the directory service table with the policy information based on the CE device in the VPN configuration request message, if the policy information in the table item allows the VPN member to dynamically modify the VPN policy.

8. The method according to claim 1, wherein, the VPN configuration request message is a request message for modifying a VPN policy and comprises a VPN ID, a VPN member ID and policy information based on a VPN, and updating the directory service table comprises:

- verifying whether policy information in a table item allows a VPN member to dynamically modify the VPN policy, if it is determined that the VPN ID and the VPN member ID exist in the table item of the directory service table; and
- determining that the verification is passed and updating the policy information based on the VPN in the table item of the directory service table with the policy information based on the VPN in the VPN configuration request message, if the policy information in the table item allows the VPN member to dynamically modify the VPN policy.

9. A directory server adapted for a Virtual Private Network system including at least a customer edge device, comprising a verification module, a configuration program module and a storage unit;

- the storage unit is adapted to store a directory service table;
- the verification module is adapted to perform a verification on a VPN configuration request message according to the directory service table and send a configuration request message to the configuration program module; and
- the configuration program module is adapted to update the directory service table according to the configuration request message received;
- wherein the at least a customer edge device sends a VPN connection request message comprising a VPN ID, a source VPN member ID and a destination VPN member ID after updating the directory service table and implementing the VPN configuration when a VPN connection needs to be established, a verification on the VPN connection request message being performed according to the directory service table, and the VPN connection being established after the verification is passed.

* * * * *